US011679563B2

(12) United States Patent
Morton, III

(10) Patent No.: US 11,679,563 B2
(45) Date of Patent: *Jun. 20, 2023

(54) THREE DIMENSIONAL PRINTING SYSTEM DETECTING OBSTRUCTIONS

(71) Applicant: 3D Systems, Inc., Rock Hill, SC (US)

(72) Inventor: John Lewis Morton, III, Temecula, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/355,601

(22) Filed: Jun. 23, 2021

(65) Prior Publication Data

US 2021/0316511 A1 Oct. 14, 2021

Related U.S. Application Data

(63) Continuation of application No. 16/295,013, filed on Mar. 7, 2019, now Pat. No. 11,072,124.

(60) Provisional application No. 62/640,806, filed on Mar. 9, 2018.

(51) Int. Cl.
| | |
|---|---|
| *B29C 64/393* | (2017.01) |
| *B29C 64/135* | (2017.01) |
| *B33Y 50/02* | (2015.01) |
| *B33Y 30/00* | (2015.01) |
| *B33Y 10/00* | (2015.01) |
| *B29C 64/10* | (2017.01) |
| *B29C 64/386* | (2017.01) |
| *B33Y 50/00* | (2015.01) |

(52) U.S. Cl.
CPC ............ *B29C 64/393* (2017.08); *B29C 64/10* (2017.08); *B29C 64/135* (2017.08); *B29C 64/386* (2017.08); *B33Y 10/00* (2014.12); *B33Y 30/00* (2014.12); *B33Y 50/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2009/0020901 A1* | 1/2009 | Schillen | B29C 70/88 |
| | | | 425/149 |
| 2012/0092724 A1 | 4/2012 | Pettis | |
| 2019/0291343 A1* | 9/2019 | Feller | B29C 64/264 |

FOREIGN PATENT DOCUMENTS

WO 2013086309 6/2013

* cited by examiner

*Primary Examiner* — Qing Yuan Wu

(57) ABSTRACT

A three dimensional printing system for manufacturing a three dimensional article includes a movement mechanism, a support tray, a resin vessel, a light engine, a sensor, and a controller. The support tray is mounted to the movement mechanism and has a lower surface for supporting the three dimensional article. The resin vessel includes a transparent sheet defining a lower bound for resin contained therein. The light engine projects pixelated light through the transparent sheet and to a build plane. The controller is configured to (a) receive a start indication for a build process, (b) operate the sensor, (c) determine if polymerized build material is in a flag region from the sensor signal, and (d) if polymerized build material is determined to be in the flag region, halt the build process.

18 Claims, 2 Drawing Sheets

THREE DIMENSIONAL PRINTING SYSTEM DETECTING OBSTRUCTIONS

CROSS REFERENCE TO RELATED APPLICATIONS

This application is a continuation of U.S. application Ser. No. 16/295,013 which was filed on Mar. 7, 2019 which claims priority to U.S. Provisional Application Ser. No. 62/640,806, Entitled "THREE DIMENSIONAL PRINTING SYSTEM DETECTING OBSTRUCTIONS" by John Lewis Morton III, filed on Mar. 9, 2018, incorporated herein by reference under the benefit of U.S.C. 119(e).

FIELD OF THE INVENTION

The present disclosure concerns an apparatus and method for manufacture of solid three dimensional (3D) articles from energy curable materials. More particularly, the present disclosure concerns an apparatus and method for preventing damage if the 3D article has not been properly unloaded from a printing system.

BACKGROUND

Three dimensional (3D) printers are in rapidly increasing use. One class of 3D printer has a general principle of operation including the selective and sequential hardening of resin layers to manufacture 3D articles. The 3D printer includes a resin vessel for holding the resin and a support tray having a lower surface upon which the 3D article is manufactured. One source of difficulty is when an operator of the printer forgets to unload a 3D article before starting manufacture of a new article. This will ruin the existing 3D article and cause severe damage to the printer. There is a desire to prevent damage that results from these errors.

SUMMARY

In a first aspect of the disclosure a three dimensional printing system for manufacturing a three dimensional article includes a movement mechanism, a support tray, a resin vessel, a light engine, a sensor, and a controller. The support tray is mounted to the movement mechanism and has a lower surface for supporting the three dimensional article. The resin vessel includes a transparent sheet defining a lower bound for resin contained therein. The light engine projects pixelated light through the transparent sheet and to a build plane. The controller is configured to (a) receive a start indication for a build process, (b) operate the sensor, (c) determine if polymerized build material is in the flag region from the sensor signal, and (d) if polymerized build material is determined to be in the flag region, halt the build process.

In one implementation the controller is configured to operate the movement mechanism to move the flag region into range with the sensor after step (a) and before step (b). The flag region is proximate to a peripheral portion of the lower surface of the support tray.

In another implementation if the build material is to be in the flag region, the controller is configured to provide instructions to a user interface or client device. The instruction would indicate one or more of that the build process is halted and of a need to replace the support tray with an empty support tray. The instructions would include one or more of a text message, an email message, a web page update, a display update and another wireless or wired messaging methods.

In yet another implementation, if the build material is not in the flag region the controller is configured to determine if the three dimensional article to be fabricated will occupy the flag region. If the three dimensional article to be fabricated will not occupy the flag region, the controller is configured to fabricate a flag feature concurrently with manufacturing the three dimensional article in a layer by layer process.

In a further implementation the controller is configured to operate the movement mechanism and the sensor to determine a height of the lower surface of the support tray. The controller utilizes the determination of the height in order to properly vertically position the support tray relative to the transparent sheet.

DETAILED DESCRIPTION OF THE PREFERRED EMBODIMENTS

Figure 1:
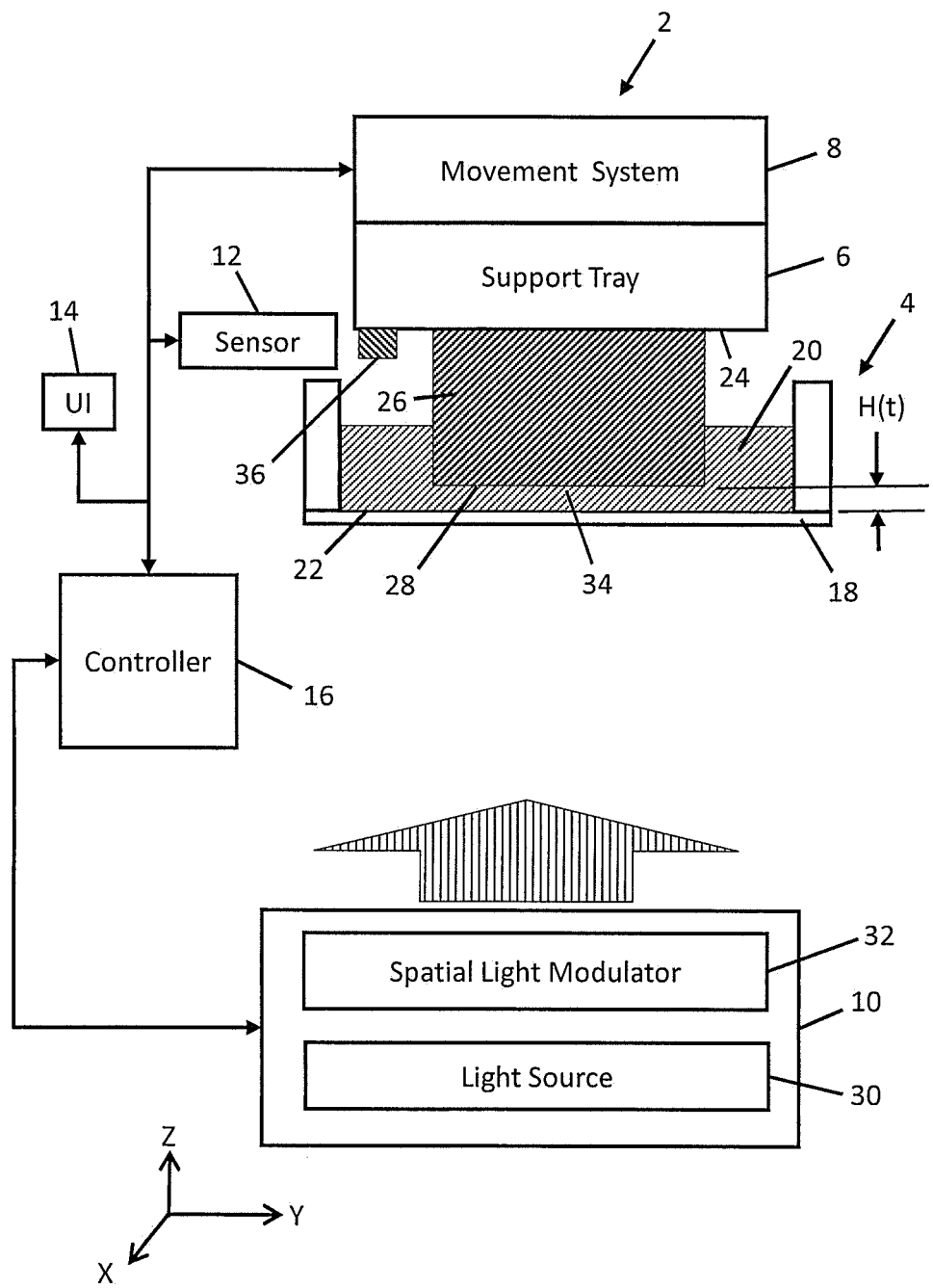
FIG. 1 is a schematic diagram of a three dimensional printing system.

FIG. 1 is a schematic diagram of an embodiment of a three dimensional printing system 2 that incorporates a safeguard to prevent damage when a full support tray is not unloaded before a new build process. In describing the three dimensional printing system 2, mutually perpendicular axes X, Y, and Z may be used. Axes X and Y are lateral axes that are aligned or nearly aligned with a horizontal plane. Axis Z is a vertical axis that is aligned or nearly aligned with a gravitational reference. The direction +Z is generally upward and the direction −Z is generally downward.

Three dimensional printing system includes a resin vessel 4, support tray 6, movement mechanism 8, light engine 10, sensor 12, user interface 14, and controller 16. The resin vessel 4 includes a light transmissive or transparent sheet 18 that sets a lower bound for resin 20. The transparent sheet 18 is an unusual and expensive material that has extremely high optical clarity and is oxygen permeable. In one embodiment the transparent sheet is formed from a Polytetrafluoroethylene (PTFE). An example of such a PTFE material is Teflon® AF-2400 which is provided by Biogeneral. The oxygen permeability serves to inhibit resin curing along an upper surface 22 of transparent sheet 18. One important aspect of the present disclosure is a system that prevents damage to the transparent sheet 18.

The support tray 6 has a lower surface 24 that supports a three dimensional article 26 that is in a process of being formed. The three dimensional article 26 has a lower face 28 upon which a new layer of resin 20 is being selectively hardened. The support tray 6 is vertically positioned by the movement mechanism 8 which controls a distance H(t) between the lower face 28 and the upper surface 22.

In the illustrated embodiment, the light engine 10 includes a light source 30 and a spatial light modulator 32. In one embodiment, the light source 30 includes one or more light emitting diodes (LEDs) that emit blue or ultraviolet (UV) light. The spatial light modulator 32 can include an array of tiny mirrors for modulating the light from the light source 30. The light engine 10 projects pixelated light up to a build plane 34 within the resin 20. The build plane 34 is a two dimensional area or thin parallelepiped that is proximate to the lower face 28. The build plane 34 defines the maximum addressable lateral extent of light engine 10. The build plane 34 is divided up into pixel elements that are defined by operation of the individual mirrors of the spatial light modulator 32. It is important that H(t) is precisely controlled whereby the cured resin at the build plane 34 is formed onto the lower face 28.

Also shown formed onto and extending downwardly from the lower surface 24 of the support tray 6 is a "flag feature" 36. A sensor 12 is shown that is positioned to detect a presence of the flag feature 36 when the lower surface 24 is at a certain height above the resin vessel 4. In one embodiment, the sensor 12 can include an optical emitter and detector pair that transmits and receives light through the location of the flag feature 36. In another embodiment, the sensor 12 can include an ultrasonic sensor. Various other embodiments can utilize different detection methods.

A user interface 14 is configured to receive inputs from and display information to a user of the three dimensional printing system 2. The inputs can be used to control the three dimensional printing system 2. The displayed information can include a status of a build of the three dimensional article 26. The user interface 14 can be a display that forms a physical part of the three dimensional printing system 2. Alternatively, the user interface 14 can be a client device 14 that is linked to the three dimensional printing system 2 through a direct connection, a wireless link, and/or a networked connection. Such a client device 14 can be one or more of a desktop computer, a smartphone, a tablet computer, a laptop computer, or a floor standing kiosk to name a few examples.

The controller 16 is controllably linked to and configured to operate the movement mechanism 8, the light engine 10, the sensor 12, the user interface 14, and other sensors or controllable portions of the three dimensional printing system 2. In some embodiments, the controller 16 can be integrated with the user interface 14. The controller can be located at one location or can be distributed among multiple locations within and/or outside of the three dimensional printing system 2. The controller 16 includes an information storage device coupled to a processor. The information storage device stores software instructions that, when executed by the processor, control the movement mechanism 8, the light engine 10, the sensor 12, the user interface 14, and other sensors or controllable portions of the three dimensional printing system 2 to perform methods such as that illustrated with respect to FIG. 2.

Figure 2:
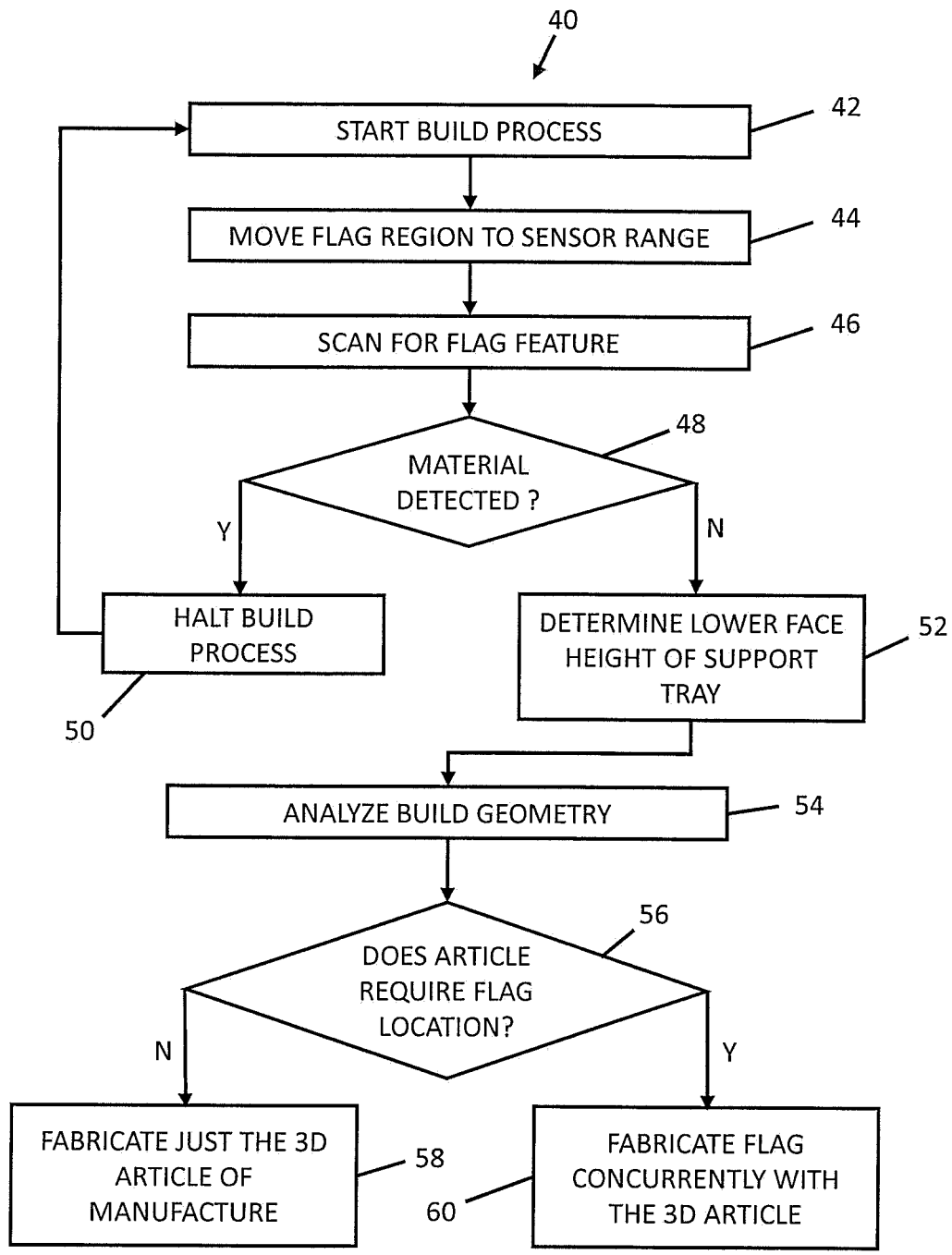
FIG. 2 is a flowchart depicting a method of manufacturing a three dimensional article.

FIG. 2 is a flowchart depicting a method 40 of manufacturing a three dimensional article 26. Controller 16 is configured to perform some or all of the method 40.

According to step 42, a user utilizes user interface 14 to start a build process for manufacturing a three dimensional article 26. Thus, according to step 42, the controller 16 receives a start indication from the user interface 14.

According to step 44, the movement mechanism 8 is activated to vertically position a flag region into a range of sensor 12. Generally speaking the flag region is proximate to a peripheral portion of the lower surface 24 of the support tray 6.

According to step 46, the sensor 12 is activated to scan for or otherwise detect build material such as a flag feature 36 or a portion of a previously fabricated three dimensional article 26 in the flag region. According to step 48, the controller 16 determines whether build material is detected in the flag region based upon information or a signal from the sensor 12.

If according to step 48, build material is detected, then the method proceeds to step 50 at which the build process is stopped. Also, as part of step 50, a message is displayed upon user interface 14 to provide a warning that a "full support tray 6" has been detected. A full support tray 16 is defined as a support tray having a previously fabricated three dimensional article 26 attached. As part of step 50, a message can be sent to a user's client device 14 such as a smartphone 14. The message can be a text message, an email message, or a message sent to a web page. The user can then unload the full support tray 6 and replace it with an empty support tray 6 before proceeding back to step 42.

If according to step 48, no build material is detected in the flag region, the method proceeds to step 52. According to step 52, the sensor 12 (or another sensor) is utilized to sense the lower surface 24 of the build tray 6. An associated height parameter is stored which is utilized for vertically positioning the build tray 6 relative to the upper surface 22 of the transparent sheet 18.

According to step 54, a build geometry is analyzed to determine whether the three dimensional article 26 will extend into the flag region. According to step 56, controller 16 determines whether there is a need for the flag feature 36. If the three dimensional article 26 sufficiently fills the sensed flag region, then there is no need to fabricate a separate flag feature 36. If, according to step 56, there is no need for a separate flag feature 36, then the method proceeds to step 58 and the three dimensional article 26 is fabricated in a layer-by-layer manner.

If according to step 56 there is a need for flag feature 36 then the method proceeds to step 60. According to step 60, the three dimensional article 26 and the flag feature 36 are fabricated concurrently in a layer-by-layer manner.

Either of step 58 or 60 involve the following steps: (1) The lower surface 24 is positioned proximate to build plane 34. (2) The light engine is activated to selectively cure and harden resin 20 at the build plane 34 and to thereby form a layer of hardened resin onto the lower surface 24. (3) The movement mechanism 8 is activated to position a lower face 28 of the hardened resin at build plane 34. (4) The light engine is activated to selectively cure and harden resin 20 at the build plane 34 and to thereby form a layer of hardened resin onto the lower face 28. (5) Steps (3) and (4) are repeated to complete the three dimensional article 26. For step 60, steps (1)-(5) also include concurrently forming the flag feature 36 at the same time the three dimensional article 26 is being formed.

In alternative embodiments, certain steps can be performed in a different order relative to other steps. For example, step 54 can be performed any time before step 56—even at the beginning of the method 40. Also, step 52 can be performed earlier than step 44 for example. Step 52 can be omitted if there is an alternative way of providing height calibration for the movement mechanism 8.

The specific embodiments and applications thereof described above are for illustrative purposes only and do not preclude modifications and variations encompassed by the scope of the following claims.

What is claimed:

1. A three dimensional printing system for manufacturing a three dimensional article comprising:
   a movement mechanism;
   a support tray mounted to the movement mechanism, the support tray having a lower surface for supporting the three dimensional article;
   a resin vessel including a transparent sheet that defines a lower bound for resin contained therein;
   a light engine that projects pixelated light through the transparent sheet and to a build plane;

a sensor positioned above the resin vessel, the sensor is configured to output a signal indicative of whether build material is adhered to the lower surface; and a controller configured to:
(a) receive a start indication for a build process;
(b) receive the signal from the sensor;
(c) determine if the build material is adhered to the lower surface;
(d) if build material is determined to be adhered to the lower surface, halt the build process; and
(e) if build material is not determined to be adhered to the lower surface, the controller is configured to determine if the three dimensional article to be fabricated will occupy a flag region of the lower surface, the flag region is proximate to the lower surface of the support tray.

2. The three dimensional printing system of claim 1 wherein the sensor is an ultrasonic sensor.

3. The three dimensional printing system of claim 1 wherein the controller is further configured to operate the movement mechanism to vertically move a flag region into range with the sensor after step (a) and before step (b), the flag region is proximate to the lower surface of the support tray.

4. The three dimensional printing system of claim 3 wherein the flag region is proximate to a peripheral portion of the lower surface of the support tray.

5. The three dimensional printing system of claim 1 wherein if build material is determined to be adhered to the lower surface, the controller is configured to transmit an indication to a user interface of a client device.

6. The three dimensional printing system of claim 5 wherein the indication includes instructions to unload and replace the support tray.

7. The three dimensional printing system of claim 5 wherein the controller transmits the indication by one or more of a text message, an email message, and an update of a web page.

8. The three dimensional printing system of claim 1 wherein if the three dimensional article to be fabricated will not occupy the flag region, the controller is configured to fabricate a flag feature concurrently with manufacturing the three dimensional article in a layer by layer process.

9. The three dimensional printing system of claim 1 wherein the controller is configured to operate the movement mechanism and the sensor to determine a height of the lower surface of the support tray.

10. The three dimensional printing system of claim 9 wherein the controller is configured to utilize the determination of the height in order to properly vertically position the support tray relative to the transparent sheet.

11. A method of manufacturing a three dimensional article comprising the steps of:
(a) providing a three dimensional printing system including:
a movement mechanism;
a support tray mounted to the movement mechanism, the support tray having a lower surface for supporting the three dimensional article;
a resin vessel including a transparent sheet that defines a lower bound for resin contained therein;
a light engine that projects pixelated light through the transparent sheet and to a build plane; and
a sensor positioned above the resin vessel, the sensor is configured to output a signal indicative of whether build material is adhered to the lower surface;
(b) receiving a start indication for a build process;
(c) receive the signal from the sensor;
(d) determine if the build material is adhered to the lower surface; and
(e) if build material is determined to be adhered to the lower surface, halt the build process; and
(f) determining if the three dimensional article to be fabricated will occupy a flag region if build material is determined not to be in the flag region, the flag region is proximate to the lower surface of the support tray.

12. The method of claim 11 further comprising operating the movement mechanism to vertically move a flag region into range with the sensor after step (b) but before step (c), the flag region is proximate to the lower surface of the support tray.

13. The method of claim 12 wherein the flag region is proximate to a peripheral portion of the lower surface of the support tray.

14. The method of claim 11 further comprising transmitting information to a user interface if the build material is determined to be adhered to the lower surface.

15. The method of claim 11 further comprising fabricating a flag feature concurrently with manufacturing the three dimensional article in a layer by layer process if the three dimensional article to be fabricated will not occupy the flag region.

16. The method of claim 11 further comprising operating the movement mechanism and the sensor to determine a height of the lower surface of the support tray.

17. The method of claim 16 further comprising utilizing the determination of the height in vertically positioning the support tray with respect to the transparent sheet.

18. A three dimensional printing system for manufacturing a three dimensional article comprising:
a movement mechanism;
a support tray mounted to the movement mechanism, the support tray having a lower surface for supporting the three dimensional article;
a resin vessel including a transparent sheet that defines a lower bound for resin contained therein;
a light engine that projects pixelated light through the transparent sheet and to a build plane;
a sensor positioned above the resin vessel, the sensor is configured to output a signal indicative of whether build material is adhered to the lower surface; and
a controller configured to:
(a) receive a start indication for a build process;
(b) receive the signal from the sensor;
(c) determine if the build material is adhered to the lower surface; and
if build material is determined to be adhered to the lower surface, halt the build process;
wherein the sensor is an optical emitter and detector pair that transmit and receive light proximate to the lower surface of the support tray.

* * * * *